UNITED STATES PATENT OFFICE.

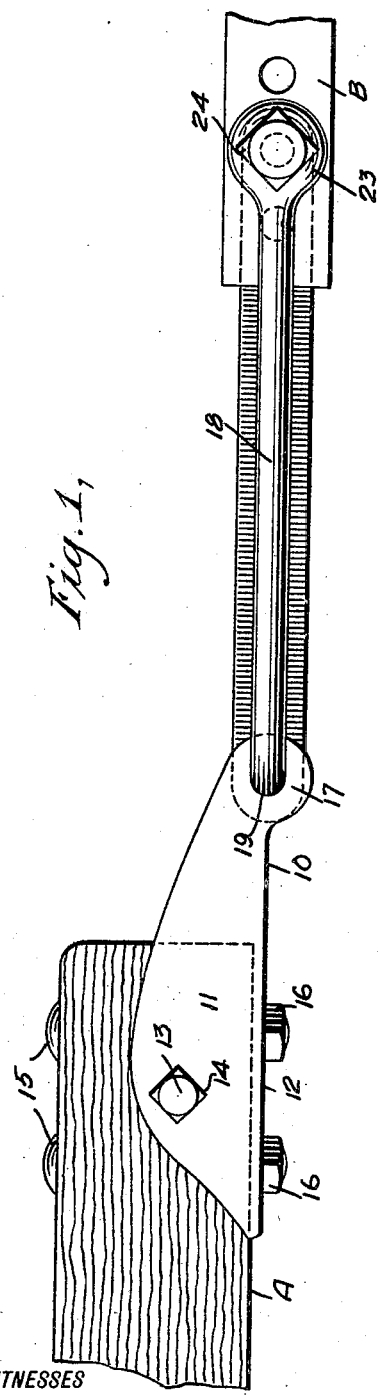
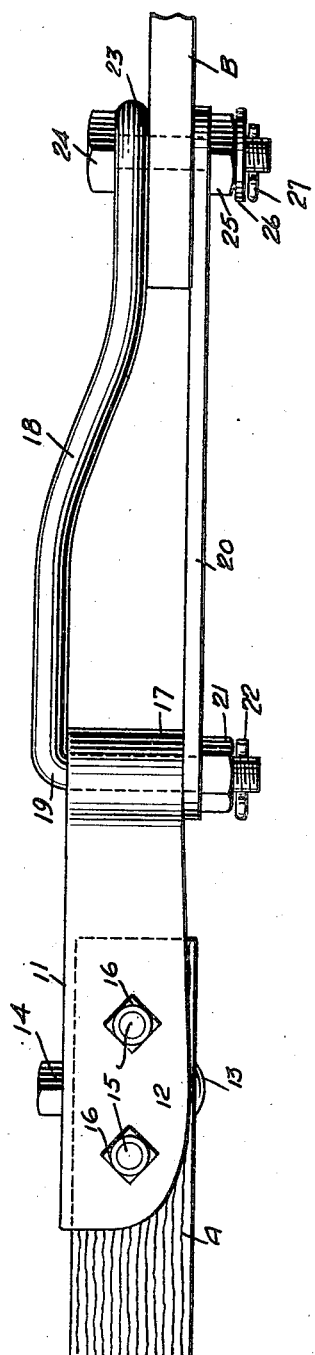

MADISON MONROE KNOWLES AND JAMES NICHOLAS BATES, OF FORT BRANCH, INDIANA.

TRACTOR HITCH.

1,417,335.　　　　Specification of Letters Patent.　　Patented May 23, 1922.

Application filed August 10, 1921. Serial No. 491,162.

*To all whom it may concern:*

Be it known that we, MADISON M. KNOWLES and JAMES N. BATES, citizens of the United States, and residents of Fort Branch, in the county of Gibson and State of Indiana, have invented a new and Improved Tractor Hitch, of which the following is a description.

The general object of our invention is to provide a tractor hitch of simple construction which may be readily applied to the stub tongue of a binder and which will afford a desirable flexibility with strength.

Reference is to be had to the accompanying drawings forming a part of this specification, it being understood that the drawings are merely illustrative of one practical embodiment of our invention.

Figure 1 is a top view of a tractor hitch embodying our invention and conventionally indicating a portion of a stub tongue of a binder and a tractor element to which the hitch is connected;

Figure 2 is a side elevation of the same.

In carrying out our invention in accordance with the illustrated example a casting 10 is provided, adapted to be applied to the stub tongue A of a binder. For securing the casting 10 the same is given a socket-like formation at the rear end by producing a horizontal top flange 11 thereon and lateral vertical flange 12 at right angles to each other, the arrangement being such that the casting will fit a corner of the tongue with the flanges 11 and 12 lying at the top and at the side of the tongue, while the solid front end is disposed at the front of the tongue adjacent to one side.

A bolt 13 passes vertically through the tongue and through the flange 11 and has a nut 14, while a pair of bolts 15 are passed transversely through the tongue and through the side flange 12 and provided with nuts 16, said bolts 15 being disposed in planes at the opposite sides of the vertical bolt 13. At its front end the casting 10 is formed with a vertical eye 17 which receives the rear downturned end 19 of a hitch bar 18, said downturned end passing through said eye and through the rear end of a flat brace bar 20, the threaded lower terminal of said downturned end receiving a nut 21 and cotter pin 22. The hitch bar 18 has its front end disposed in a lower plane than the rear end to bring the line of draft in the plane of the tongue A and said front end is given the form of an eye 23 through which a vertical bolt 24 is passed, said bolt passing also through the rear end of the hitch member of the tractor conventionally indicated at B and through the front end of the brace bar 20, the lower threaded end of bolt 24 having a nut 25, washer 26, and cotter pin 27.

With the described arrangement the desired line of draft is secured as well as lateral flexibility while the hitch bar 18 and brace bar 20 make for strength.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claim.

Having thus described our invention, we claim:

A hitch, comprising a pair of bars extending parallel to each other, one of said bars being provided with an opening at each end thereof, the other of said bars being provided with an opening in one end thereof in register with one opening of the other bar, and a down-turned threaded end passing through a draft-fitting, and the other opening of the other bar, a bolt for said registered openings, and a screw nut for said down-turned end.

MADISON MONROE KNOWLES.
JAMES NICHOLAS BATES.